United States Patent
Kelly et al.

(10) Patent No.: US 8,751,143 B2
(45) Date of Patent: *Jun. 10, 2014

(54) SYSTEM AND METHOD FOR TESTING CRASH AVOIDANCE TECHNOLOGIES

(71) Applicant: Dynamic Research Inc., Torrance, CA (US)

(72) Inventors: Joseph Kelly, Lakewood, CA (US); Peter Broen, Torrance, CA (US); Jordan Silberling, Redondo Beach, CA (US); John Zellner, Rancho Palos Verdes, CA (US)

(73) Assignee: Dynamic Research, Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,039

(22) Filed: Oct. 9, 2013

(65) Prior Publication Data

US 2014/0039727 A1 Feb. 6, 2014

Related U.S. Application Data

(63) Continuation-in-part of application No. 13/532,430, filed on Jun. 25, 2012, now Pat. No. 8,589,062, and a continuation-in-part of application No. 13/532,366, (Continued)

(51) Int. Cl.
*G06F 17/10* (2006.01)
*G06G 7/78* (2006.01)
*G08G 1/16* (2006.01)

(52) U.S. Cl.
USPC ............... 701/301; 73/12.01; 303/121

(58) Field of Classification Search
USPC ........ 701/70, 71, 78, 301; 73/12.01; 303/121; 434/305
See application file for complete search history.

(56) References Cited

U.S. PATENT DOCUMENTS

| | | | |
|---|---|---|---|
| 4,530,056 A | 7/1985 | MacKinnon et al. | |
| 5,338,206 A * | 8/1994 | Hupfer | 434/305 |

(Continued)

OTHER PUBLICATIONS

Zellner et al., "Extension of the Honda-DRI "Safety Impact Methodology" (SIM) for the NHTSA Advanced Crash Avoidance Technology (ACAT) Program and Application to a Prototype Advanced Collision Mitigation Braking System," SAE International, Paper No. 2009-01-0781; pp. 1-21, Apr. 20, 2009.

(Continued)

*Primary Examiner* — Thomas Black
*Assistant Examiner* — Isaac Smith
(74) *Attorney, Agent, or Firm* — Manuel F. de la Cerra

(57) ABSTRACT

A cam actuated hydraulic brake system and an in plane tensioner pulley belt drive system may be used on autonomous vehicles, such as dynamic motion elements for the evaluation of various crash avoidance technologies. The brake system utilizes a cam driven by a servo to push the piston push rod of a hydraulic master brake cylinder, thus distributing pressurized brake fluid throughout the brake system. The pulley drive system uses an articulating arm for the driven pulley, and that arm may also have connected to it one or two tension pulleys, each of which is in contact with the belt. Because the drive pulley and the tensioner pulleys pivot about the same pivot axis, the needed belt length remains nearly constant across the entire range of the articulating arm.

25 Claims, 16 Drawing Sheets

Related U.S. Application Data filed on Jun. 25, 2012, now Pat. No. 8,428,863, and a continuation-in-part of application No. 13/532,383, filed on Jun. 25, 2012, now Pat. No. 8,428,864, and a continuation-in-part of application No. 13/532,396, filed on Jun. 25, 2012, now Pat. No. 8,457,877, and a continuation-in-part of application No. 13/532,417, filed on Jun. 25, 2012, now Pat. No. 8,583,358, said application No. 13/532,430 is a continuation-in-part of application No. 13/357,526, filed on Jan. 24, 2012, now Pat. No. 8,447,509.

(60) Provisional application No. 61/874,274, filed on Sep. 5, 2013, provisional application No. 61/874,267, filed on Sep. 5, 2013, provisional application No. 61/874,264, filed on Sep. 5, 2013, provisional application No. 61/507,539, filed on Jul. 13, 2011, provisional application No. 61/578,452, filed on Dec. 21, 2011, provisional application No. 61/621,597, filed on Apr. 9, 2012, provisional application No. 61/639,745, filed on Apr. 27, 2012.

(56) References Cited

U.S. PATENT DOCUMENTS

| | | | |
|---|---|---|---|
| 5,550,742 | A | 8/1996 | Furuya et al. |
| 5,684,696 | A | 11/1997 | Rao et al. |
| 5,749,633 | A * | 5/1998 | Baumgartner ............ 303/113.1 |
| 6,114,985 | A | 9/2000 | Russell et al. |
| 7,103,704 | B2 | 9/2006 | Chatterjee |
| 7,575,491 | B1 | 8/2009 | Martin |
| 7,617,048 | B2 | 11/2009 | Simon et al. |
| 2005/0155441 | A1 | 7/2005 | Nagata |
| 2010/0087984 | A1 | 4/2010 | Joseph |
| 2010/0109835 | A1 | 5/2010 | Alrabady et al. |
| 2011/0270467 | A1 | 11/2011 | Steffan et al. |

OTHER PUBLICATIONS

Zellner et al., "Extension of the Honda-DRI "Safety Impact Methodology" (SIM) for the NHTSA Advanced Crash Avoidance Technology (ACAT) II Program and Application to the Evaluation of a Pre-Production Head-On Crash Avoidance Assist System—Progress Report", SAE International, Paper No. 2012-01-0291, pp. 1-20, Apr. 16, 2012.

Kelly et al., "Development of a Guided Soft Target for Crash Avoidance Technology Evaluation", SAE International, Paper No. 2011-01-0580, pp. 1-9, Apr. 12, 2011.

Testing and Verification of Active Safety Systems With Coordinated Automated Driving, Dr. Hans-Peter Schöner, Dr. Stephen Neads, Nikolai Schretter.

Development of advanced driver assistance systems with vehicle hardware-in-the-loop simulations, O. Gietelink, J. Ploeg, B. De Schutter, and M. Verhaegen, Vehicle System Dynamics, vol. 44, No. 7, pp. 569-590, Jul. 2006.

Vehicle to Vehicle Interaction Maneuvers Choreographed with an Automated Test Driver, Anmol Sidhu and Dennis A. Guenther, Ron A. Bixel and Gary J. Heydinger, Paper #: 2009-01-0440, Published: Apr. 20, 2009, SAE World Congress & Exhibition.

Automated Steering Controller for Vehicle Testing, Mikesell, D., Sidhu, A., Guenther, D., Heydinger, G. et al., Paper #: 2007-01-3647, Published: Aug. 5, 2007, Asia Pacific Automotive Engineering Conference.

* cited by examiner

Section A-A
Prior Art

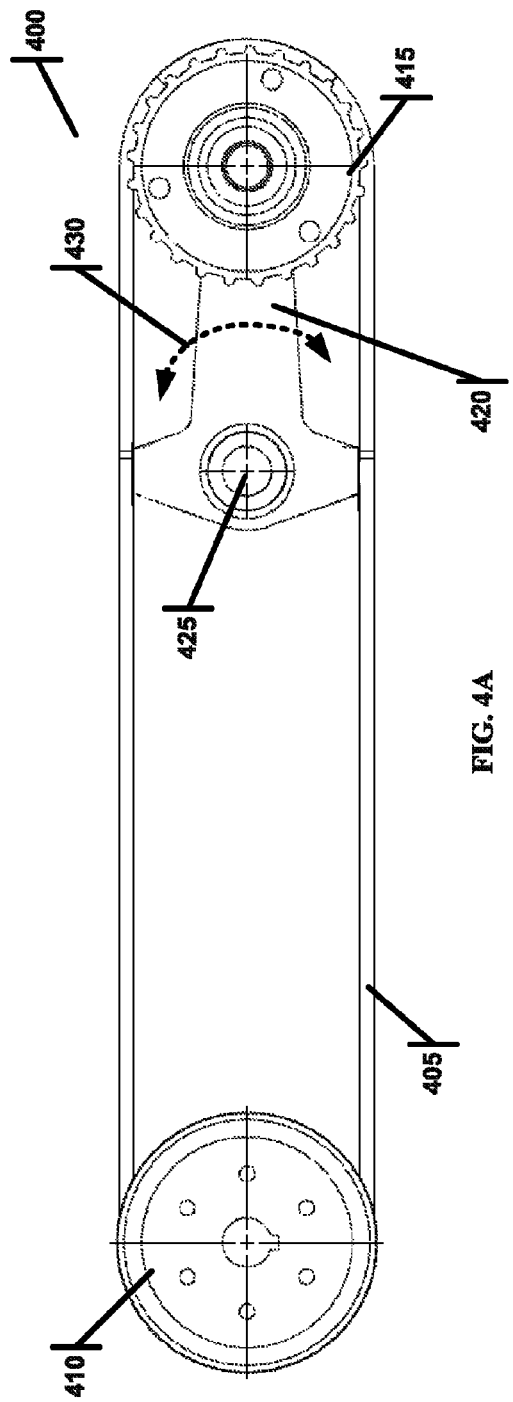
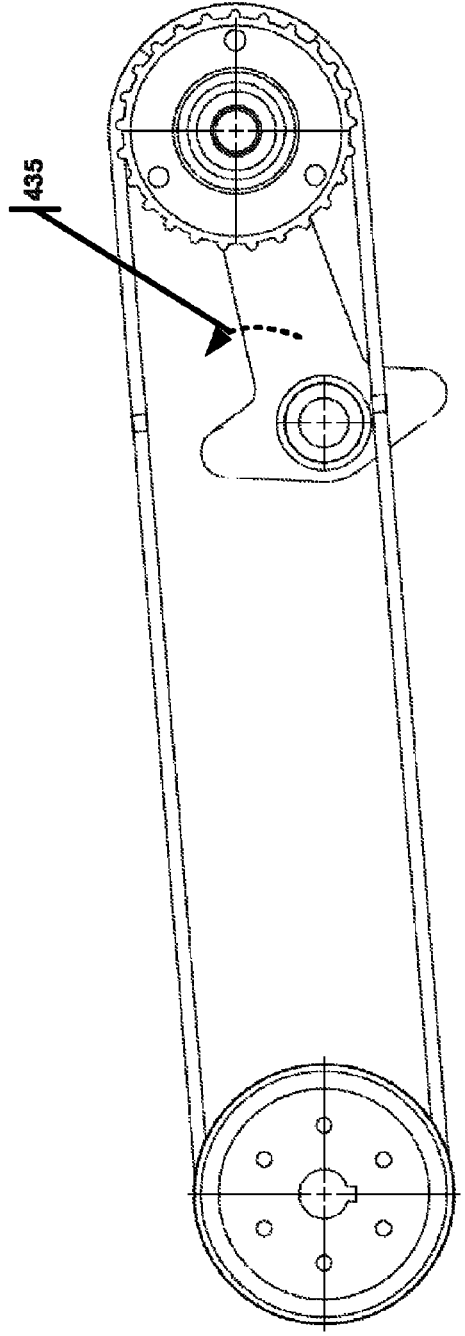
FIG. 4A
FIG. 4B

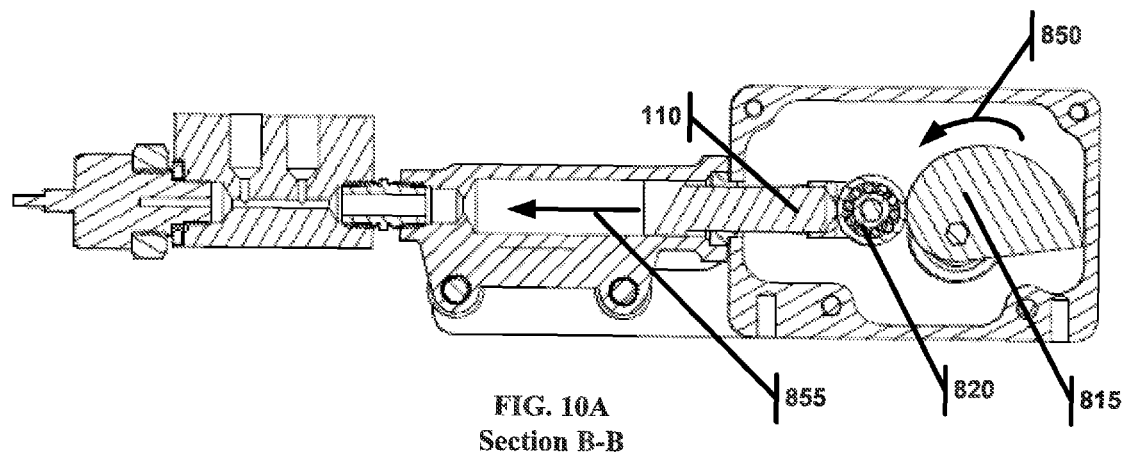
FIG. 10A
Section B-B
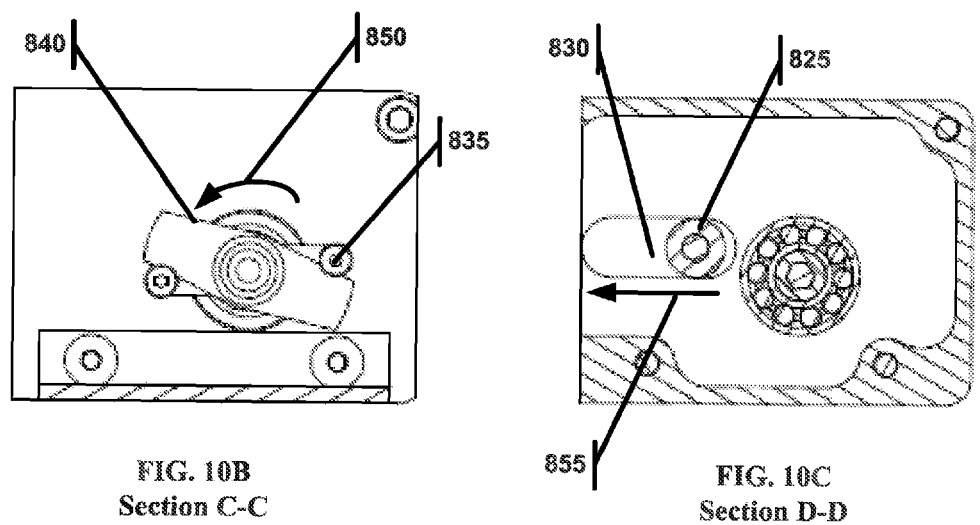
FIG. 10B
Section C-C
FIG. 10C
Section D-D

SYSTEM AND METHOD FOR TESTING CRASH AVOIDANCE TECHNOLOGIES

1.0 RELATED APPLICATIONS

This application claims the benefit of U.S. Provisional Application No. 61/874,274 entitled "Master-Slave Automated Coordinated Vehicle Control" filed Sep. 5, 2013 by Joseph Kelly et al; and of U.S. Provisional Application No. 61/874,267 entitled "Rigid Belt Drive Tensioner" filed Sep. 5, 2013 by Joseph Kelly et al; and of U.S. Provisional Application No. 61/874,264 entitled "Robotic Hydraulic Brake Master Cylinder" filed Sep. 5, 2013 by Joseph Kelly et al; and is also a continuation-in-part of U.S. patent application Ser. No. 13/532,430 entitled "Devices, Systems, And Methods For Testing Crash Avoidance Technologies" filed on Jun. 25, 2012 by Joseph Kelly et al.; and is also a continuation-in-part of U.S. patent application Ser. No. 13/532,366 entitled "Devices, Systems, And Methods For Testing Crash Avoidance Technologies" filed on Jun. 25, 2012 by Joseph Kelly et al (issued as U.S. Pat. No. 8,428,863); and is also a continuation-in-part of U.S. patent application Ser. No. 13/532,383 entitled "Devices, Systems, And Methods For Testing Crash Avoidance Technologies" filed on Jun. 25, 2012 by Joseph Kelly et al (issued as U.S. Pat. No. 8,428,864); and is also a continuation-in-part of U.S. patent application Ser. No. 13/532,396 a entitled "Devices, Systems, And Methods For Testing Crash Avoidance Technologies" filed on Jun. 25, 2012 by Joseph Kelly et al (issued as U.S. Pat. No. 8,457,877); and is also a Continuation-in-part of U.S. patent application Ser. No. 13/532,417 entitled "Devices, Systems, And Methods For Testing Crash Avoidance Technologies" filed on Jun. 25, 2012 by Joseph Kelly et al; all of which are hereby incorporated in their entirety including all tables, figures, and claims.

2.0 TECHNICAL FIELD

The present invention relates to devices, systems, and methods for testing crash avoidance technologies.

3.0 BACKGROUND

The system disclosed herein can be used with, but is not limited to, vehicles employed in crash avoidance technologies disclosed in the following patent applications developed by the same inventors and assigned to the same assignee: U.S. Patent Application No. 61/874,274 entitled "Master-Slave Automated Coordinated Vehicle Control" filed Sep. 5, 2013 by Joseph Kelly et al; U.S. Patent Application No. 61/874,267 entitled "Rigid Belt Drive Tensioner" filed Sep. 5, 2013 by Joseph Kelly et al; U.S. Patent Application No. 61/874,264 entitled "Robotic Hydraulic Brake Master Cylinder" filed Sep. 5, 2013 by Joseph Kelly et al; U.S. patent application Ser. No. 13/357,526 entitled "System and Method for Testing Crash Avoidance Technologies" filed Jan. 24, 2012 by Joseph Kelly et al (issued as U.S. Pat. No. 8,447,509); U.S. Patent Application No. 61/507,539 entitled "Guided Soft Target For Full Scale Advanced Crash Avoidance Technology Testing" filed on Jul. 13, 2011 by Joseph Kelly et al; U.S. Patent Application No. 61/578,452 entitled "Guided Soft Target For Full Scale Advanced Crash Avoidance Technology Testing" filed on Dec. 21, 2011 filed by Joseph Kelly et al; U.S. Patent Application No. 61/621,597 entitled "Collision Partner, System and Method" filed on Apr. 9, 2012 by Joseph Kelly et al; U.S. Patent Application No. 61/639,745 entitled "Devices, Systems, And Methods For Testing Crash Avoidance Technologies" filed on Apr. 27, 2012 by Joseph Kelly et al; U.S. patent application Ser. No. 13/532,366 entitled "Devices, Systems, And Methods For Testing Crash Avoidance Technologies" filed on Jun. 25, 2012 by Joseph Kelly et al (issued as U.S. Pat. No. 8,428,863); U.S. patent application Ser. No. 13/532,383 entitled "Devices, Systems, And Methods For Testing Crash Avoidance Technologies" filed on Jun. 25, 2012 by Joseph Kelly et al (issued as U.S. Pat. No. 8,428,864); U.S. patent application Ser. No. 13/532,396 entitled "Devices, Systems, And Methods For Testing Crash Avoidance Technologies" filed on Jun. 25, 2012 by Joseph Kelly et al (issued as U.S. Pat. No. 8,457,877); U.S. patent application Ser. No. 13/532,417 entitled "Devices, Systems, And Methods For Testing Crash Avoidance Technologies" filed on Jun. 25, 2012 by Joseph Kelly et al; and U.S. patent application Ser. No. 13/532,430 entitled "Devices, Systems, And Methods For Testing Crash Avoidance Technologies" filed on Jun. 25, 2012 by Joseph Kelly et al. Each of these patent applications is incorporated herein in their entirety.

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. Evaluating such ACAT systems presents many challenges. For example, the evaluation system should be able to deliver a potential Soft Collision Partner (Soft CP) reliably and precisely along a trajectory that would ultimately result in a crash in a variety of configurations, such as rear-ends, head-ons, crossing paths, and sideswipes. Additionally, the Soft Collision Partner should not pose a substantial physical risk to the test driver, other test personnel, equipment, or to subject vehicles in the event that the collision is not avoided. This challenge has been difficult to address. Third, the Soft CP should appear to the subject vehicle as the actual item being simulated, such as a motor vehicle, a pedestrian, or other object. For example, the Soft CP should provide a consistent signature for radar and other sensors to the various subject vehicles, substantially identical to that of the item being simulated. It would be also advantageous for the Soft CP to be inexpensive and repeatably reusable with a minimum of time and effort.

As disclosed in the inventors' previous patent applications, fully incorporated herein by reference, the Guided Soft Target (GST) system includes a dynamic motion element (DME) as a mobile and controllable platform that carries the Soft CP. The DME is of such shape and dimension that it can be run over by the vehicle under test (aka the subject vehicle), with little to no damage to either the DME or the subject vehicle. When a collision occurs with the GST system, the subject vehicle impacts the Soft CP, which then absorbs the collision and may collapse. Such a Soft CP is disclosed in U.S. patent application Ser. No. 13/532,366 (issued as U.S. Pat. No. 8,428,863), incorporated by reference. This is disclosed fully in the previous patent applications listed above and incorporated by reference.

The innovations disclosed in this application are directed to systems that may be used on the DME or, more generally, a remote controlled vehicle. The systems include improvements to the braking systems and drive systems of such vehicles.

4.0 SUMMARY

What is disclosed herein is an electronically-controlled hydraulic braking system for an autonomous vehicle such as a DME. The system includes a servo motor connected to a cam, the cam adapted to rotate when the servo motor is actuated. The system also includes a master cylinder containing hydraulic fluid and a piston push rod, the push rod is positioned adjacent to the cam such that when the cam is rotated, the push rod moves into the master cylinder thus causing the movement of hydraulic fluid into and out of the master cylinder. A controller may be connected to the servo motor and provides a signal to actuate the servo motor.

The brake system may further include a manifold that distributes the pressurized hydraulic fluid to wheel brake assemblies connected to the wheels. Those assemblies may include, but are not limited to, disk brakes and drum brakes.

Also disclosed herein is a belt drive system that includes a tensioner pulley that is in same rotational plane as the articulating arm of the driven pulley, and rotate about the same pivot axis. The belt drive system includes a belt connected to a drive pulley and adapted to transfer power from the drive pulley to a driven pulley. The belt defines a belt plane. The system also includes an articulating arm that pivots about a pivot axis within the belt plane, wherein the driven pulley is connected to the articulating arm such that it can pivot about the pivot axis. A tensioner pulley is also connected to the articulating arm such that it can pivot about the pivot axis and is in contact with the belt.

The system may further include a second tensioner pulley connected to the articulating arm such that it can pivot about the pivot axis and the second pulley is also in contact with the belt. The positioning of the tensioner pulleys is also disclosed so as to maintain a near constant needed belt length. For example, the tensioner pulleys each spin about a pulley axle and those axles may be positioned relative to the pivot axis in a generally straight line within the belt plane and/or generally equidistant from the pivot axis.

Other aspects of the invention are disclosed herein as discussed in the following Drawings and Detailed Description.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views. It will be understood that certain components and details may not appear in the figures to assist in more clearly describing the invention.

FIG. 4A illustrates a belt drive system, with an articulating arm supporting one of the pulleys, in the neutral position.

FIG. 4B illustrates the belt drive system of FIG. 4A wherein the driven pulley is in a non-neutral position.

FIG. 10A is the cross section view taken along line B-B of FIG. 9.

FIG. 10B is the cross section view taken along line C-C of FIG. 9.

FIG. 10C is the cross section view taken along line D-D of FIG. 9.

6.0 DETAILED DESCRIPTION

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

Figure 1A:
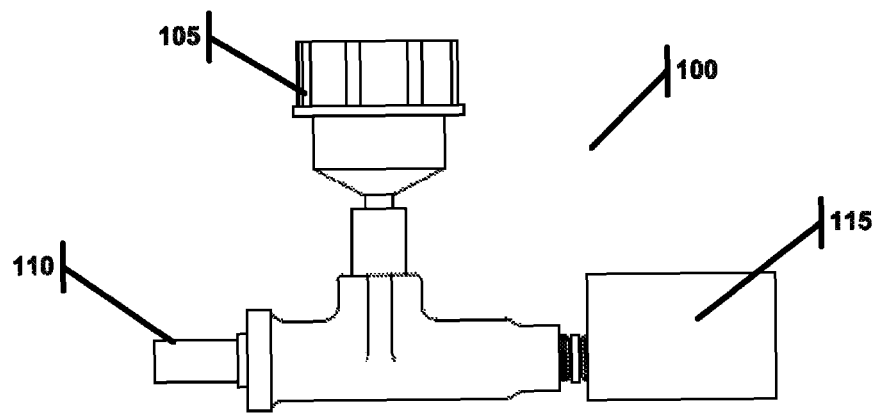
FIG. 1A illustrates a conventional master cylinder.
Figure 1B:
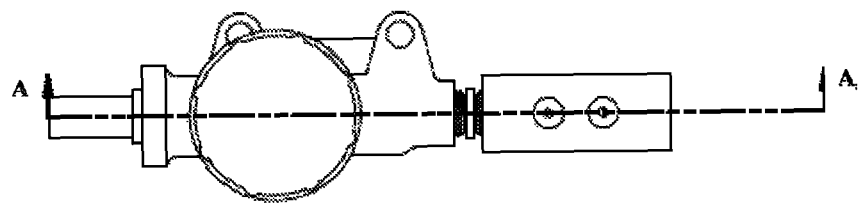
FIG. 1B is a top view of the conventional master cylinder of FIG. 1A.
Figure 1C:
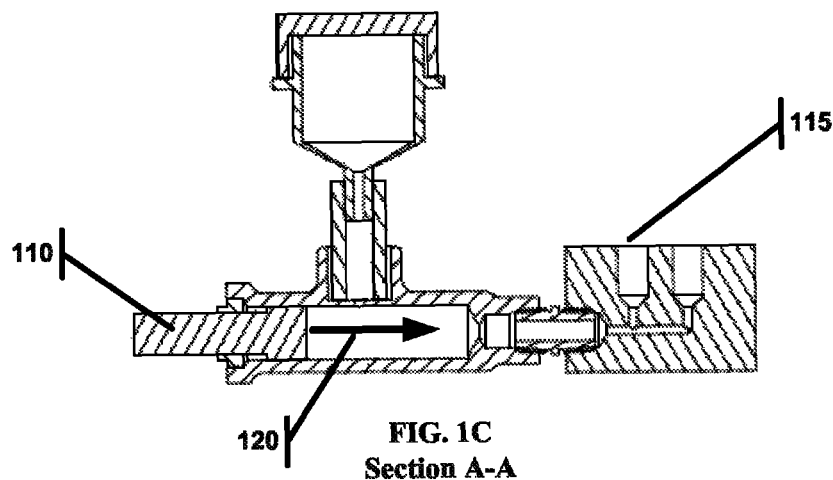
FIG. 1C is the cross section view taken along section A-A of FIG. 1B.
Figure 1D:
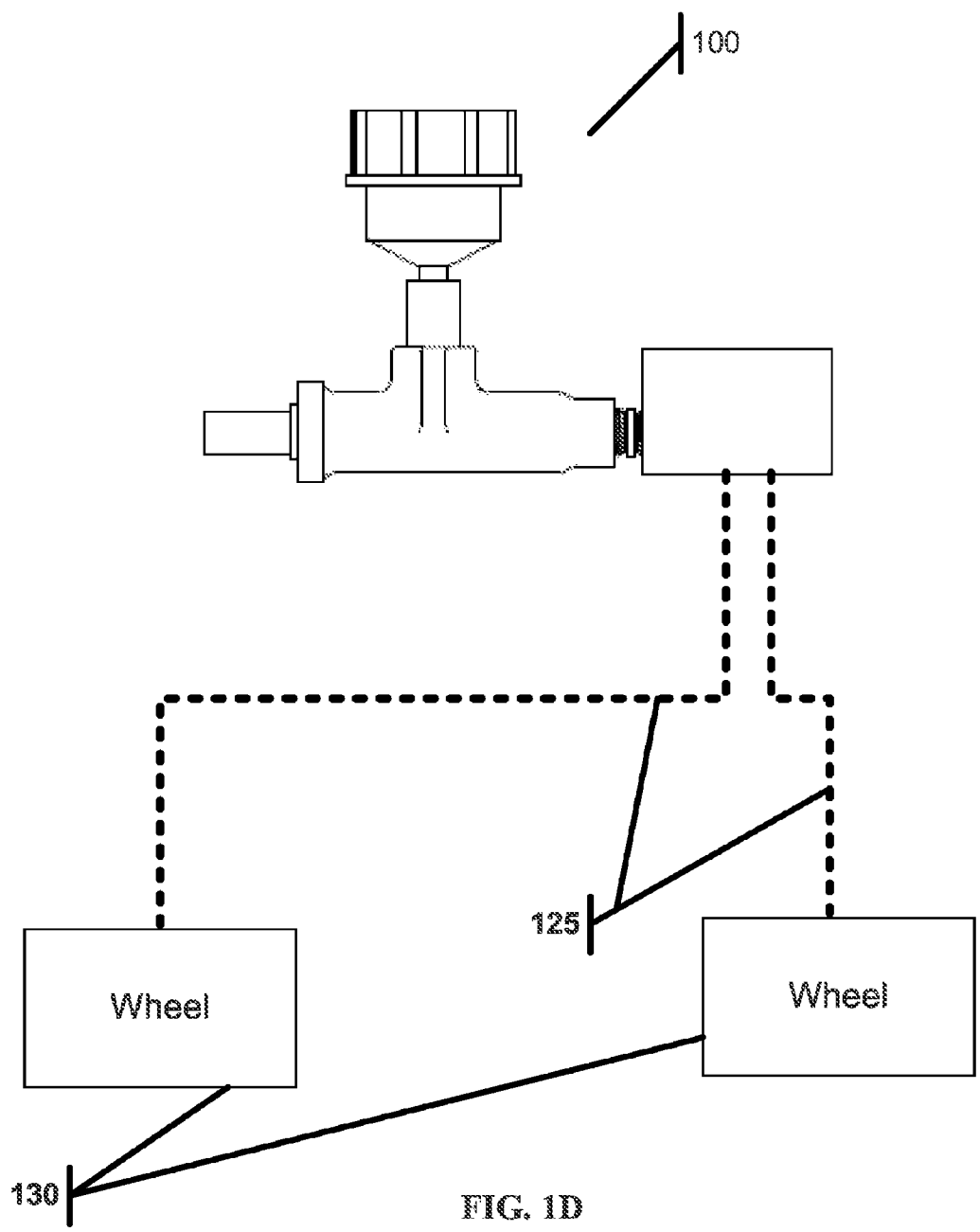
FIG. 1D illustrates a conventional master cylinder and hydraulic line/hose routed to the wheel brake assemblies via a hydraulic manifold

As disclosed in patent application Ser. No. 13/532,417 incorporated herein by reference, the DME may use hydraulic brakes connected to one or more of its wheels. There are, however, several shortcomings to the systems that actuate the hydraulic brake system. FIGS. 1A-1D provide background for the basic parts and operation of a hydraulic master cylinder 100. The cylinder includes a brake fluid reservoir 105 that includes hydraulic brake fluid, a piston push rod 110 and a manifold 115 that distributes the hydraulic brake fluid. FIG. 1C illustrates the operation of the master cylinder 100. As the piston push rod 110 is pressed into the master cylinder in the direction of arrow 120, it causes the hydraulic fluid to move out of the master cylinder 100 to the manifold 115 and out to the brake lines under pressure. In FIG. 1D, the brake lines 125 are attached to the manifold 115 and to the wheel brake assembly 130. When the push rod 110 is pushed, pressurized brake fluid runs through the lines 125 to the wheel brake assemblies 130 which then actuate the brakes. The wheel brake assemblies 130 may include for example disk brakes or drum brakes. The wheel brake assembly need not be connected directly to the wheels. For example, in the DME described below with reference to FIG. 6, the rear wheel brake assembly is located on the motor axle.

Figure 2A:
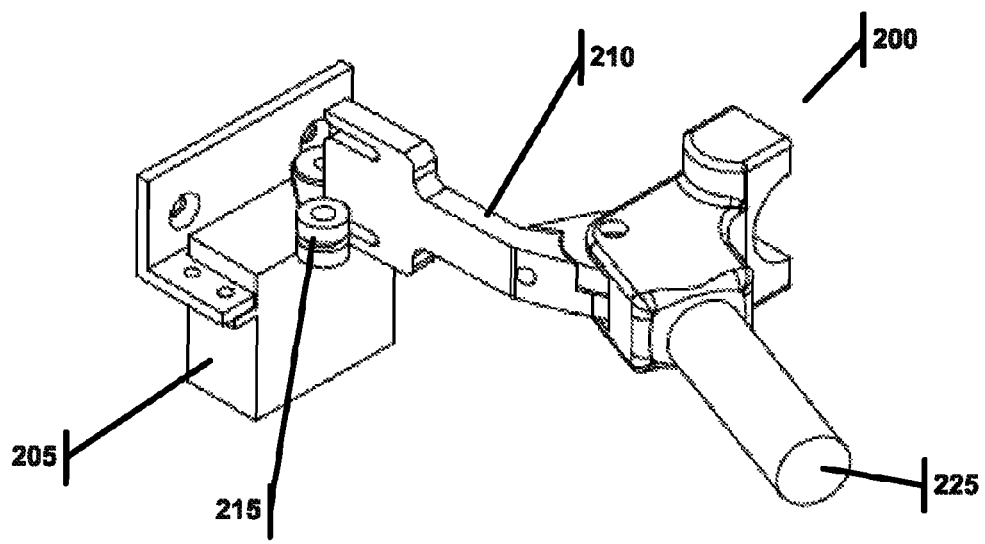
FIG. 2A is an isometric view of a brake actuator that uses a paddle type lever assembly.
Figure 2B:
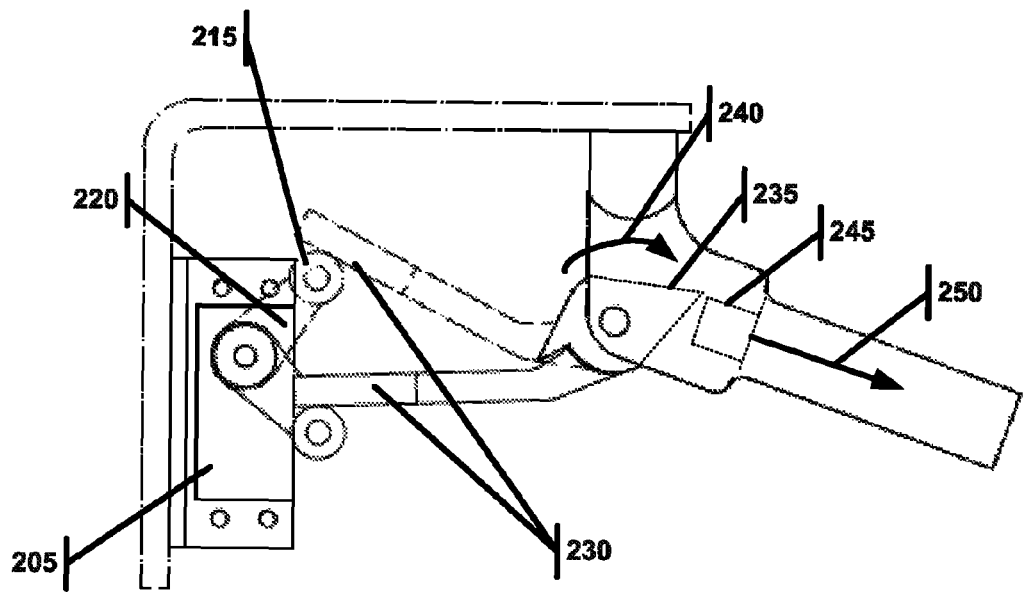
FIG. 2B is a top view of the brake actuator that uses a paddle type lever assembly shown in FIG. 2A.

Referring to FIGS. 2A, 2B, 3A and 3B, previous brake actuations systems are disclosed. FIGS. 2A and 2B illustrate a paddle type linkage system 200. This system 200 includes a servo 205 with a roller 215 connected to the servo arm 220 that contacts a paddle 210. The paddle 210 contacts the master cylinder assembly 225. As shown in FIG. 2B, as the servo arm 220 turns, the roller 215 moves the paddle (movement shown in 230). The paddle 210 is hinged and rotates in the direction of arrow 240, which causes the other end of the paddle 235 to push the push rod 245 of the master cylinder in the direction of arrow 250. The primary disadvantages to this system include: the inability to use a large range of motion of the servo, very non-linear relationship between servo torque and master cylinder pressure, frequent manual tuning and adjustment is necessary to maintain optimal performance and high radial loading of servo output shaft bearing, resulting in shortened servo life.

Figure 3A:
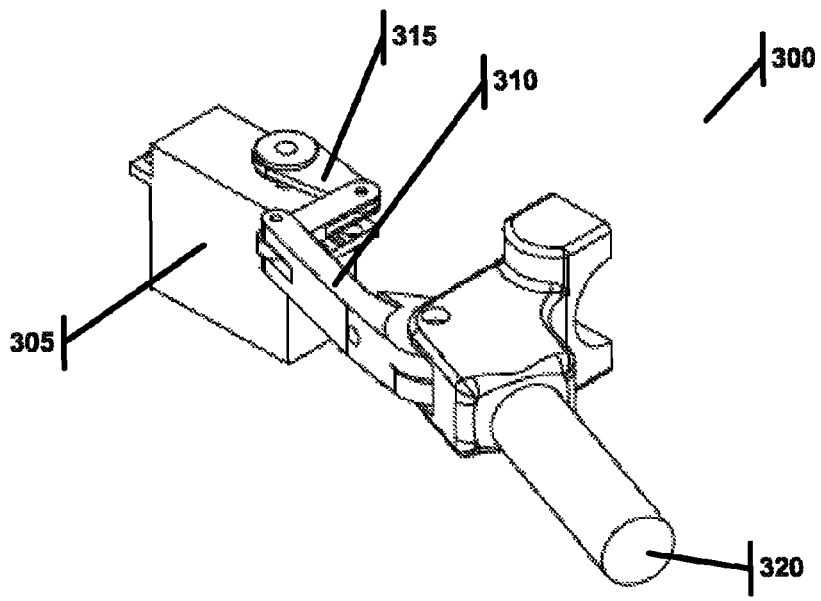
FIG. 3A is an isometric view of the brake actuator that uses a four-bar linkage lever assembly.
Figure 3B:
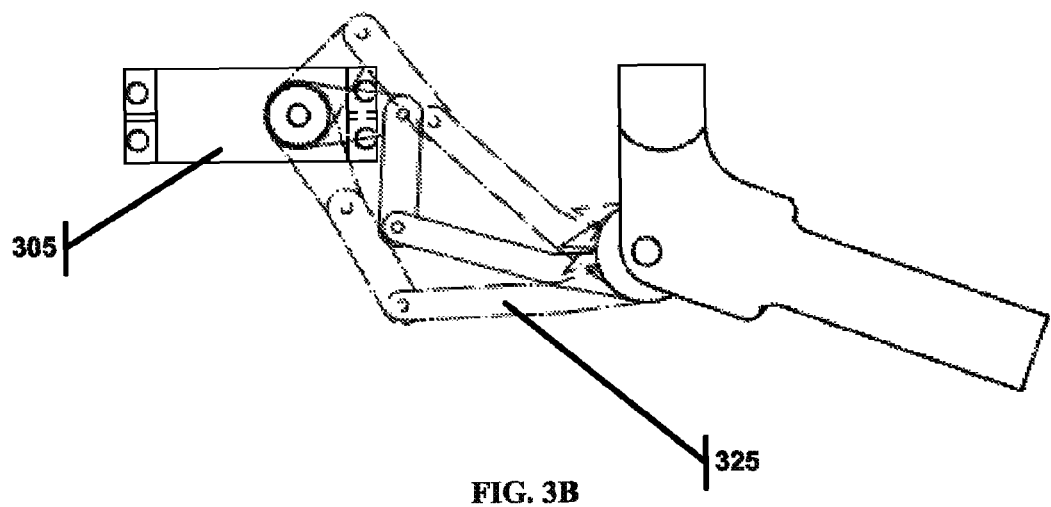
FIG. 3B is a top view of the brake actuator that uses a four-bar linkage lever assembly shown in FIG. 3A.

FIGS. 3A and 3B illustrate a 4-bar linkage system 300. The system 300 includes a servo 305 connected to a servo arm 315, that is connected to the linkage 310. The linkage 310 contacts the master cylinder assembly 320. As shown in FIG. 3B, as the servo arm 315 turns, the linkage 310 moves (movement shown in 325). The end of the linkage is similar to the end of the paddle discussed above with reference to FIG. 2B. So the movement the linkage 310 by the servo 305, ultimately pushes the master cylinder piston push rod, thus actuating the braking system. The shortcomings of this system are the same as those of the paddle system described above.

The DME also uses a belt drive system. In belt-drive systems where drive and driven pulley locations do not change during the course of operation, simply setting the belt tension before operation is sufficient. However, in systems where the pulleys move relative to one another during operation, a means of maintaining belt tension is required.

Referring to FIGS. 4A and 4B, the belt drive system 400 is disclosed. The system 400 comprises a belt 405 that transfers power from the drive pulley 410 to the driven pulley 415. The driven pulley 415 has a suspension system that allows the driven pulley 415 to travel up as shown in FIG. 4B from the neutral position (shown in FIG. 4A), or down from the neutral position (not shown). The suspension system may be used to absorb some of the shock that the wheel encounters so as to smooth out the ride for the DME. Also the suspension system allows the DME to squat when it is run over by the subject, thereby minimizing the damages to that vehicle and the DME. The suspension system uses an articulating arm 420 that supports the driven pulley 415 and pivots about point 425 in the direction of arrow 430. FIG. 4B illustrates the suspension in the up position, with arrow 435 showing the direction the arm had moved so that the driven pulley is no longer in the neutral position. The movement of the drive pulley relative to the driven pulley changes the length of the needed belt path. In the system shown in FIGS. 4A and 4B, the belt would begin to slip or resonate because of this change in the needed belt length.

Figure 5A:
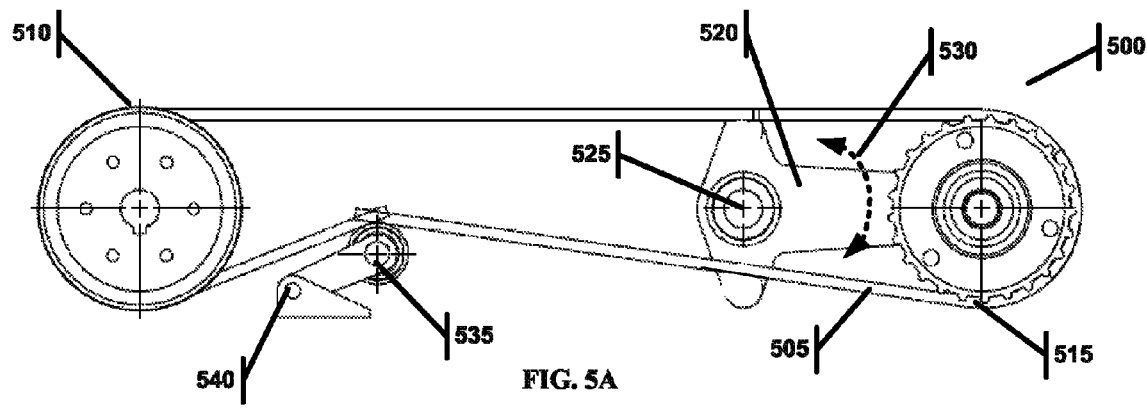
FIG. 5A illustrates a belt drive system, with an articulating arm supporting one of the pulleys and a tensioner pulley, in the neutral position.
Figure 5B:
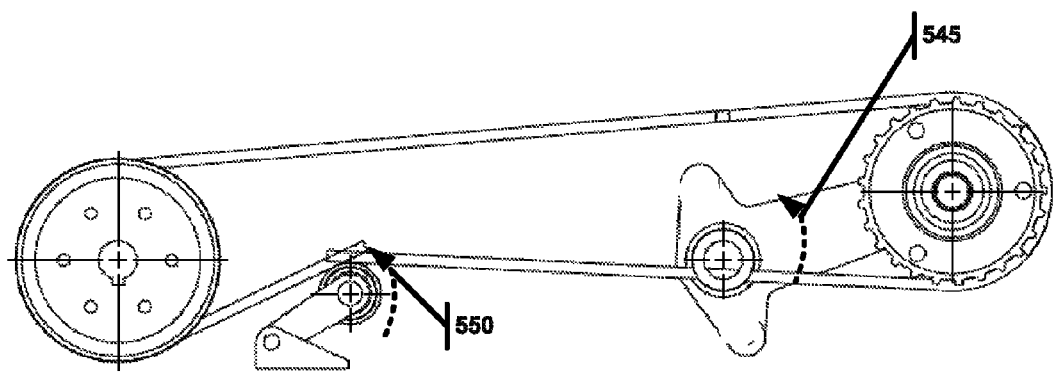
FIG. 5B illustrates the belt drive system of FIG. 5A wherein the driven pulley is in a non-neutral up position.
Figure 5C:
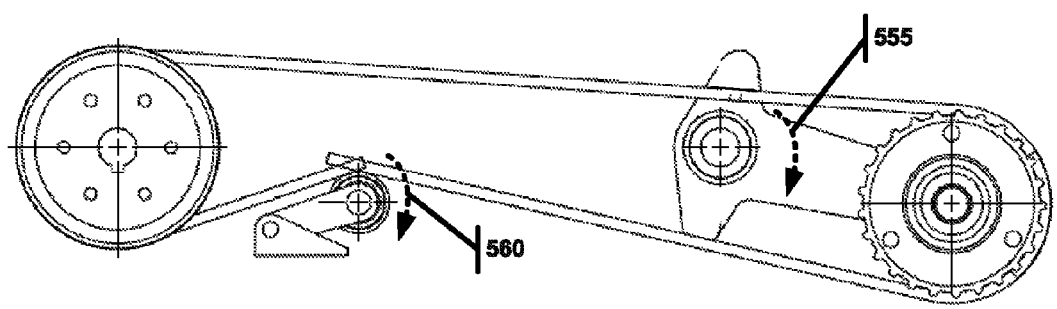
FIG. 5C illustrates the belt drive system of FIG. 5A wherein the driven pulley is in a non-neutral down position.

FIGS. 5A-5C illustrate a solution to this problem which implements a single spring-loaded tensioner pulley. The system 500 comprises a belt 505 that transfers power from the drive pulley 510 to the driven pulley 515. The driven pulley 515 has a suspension system as described above and may travel up as shown in FIG. 5B. The suspension system uses an articulating arm 520 that supports the driven pulley 515 and pivots about point 525 in the direction of arrow 530. FIG. 5B illustrates the suspension in the up position, with arrow 545 showing the direction the arm had moved so that the driven pulley is no longer in the neutral position. The system 500 further includes a spring-loaded tensioner pulley 535 connected to an articulating arm that pivots about point 540. The tensioner pulley 535 may travel up as shown in FIG. 5B (arrow 550), which would help maintain a near constant needed belt length. The tensioner pulley 535 may also travel down as shown in FIG. 5C (arrow 560), which again maintains a near constant needed belt length.

However, the introduction of this spring-loaded pulley 535 can introduce unwanted compliance in the belt drive system 500, resulting in either belt slippage, or loss of adequate control, especially in a bi-directional system. For example, if the drive pulley 510 is turned counterclockwise, and a load exists on the driven pulley 515, the top of the belt 505 is put into tension, and the bottom of the belt is slackened. The slack is taken up by the tensioner pulley 535, and the belt tension is somewhat maintained. However, if the drive pulley 510 then rotates in the clockwise direction, and a load is present on the driven pulley 515, the bottom of the belt 505 is put into higher tension, causing the tensioner pulley 535 to deflect downward, causing the rest of the belt to slacken, which can lead to slippage. Also, as illustrated in FIGS. 5A-5C, the belt tension changes as a function of the articulation angle at the pivot axis, since the spring-loaded tensioner pulley 535 is loaded more heavily in the full-down position than it is at the neutral or full up position.

The systems disclosed and claimed below address the shortcomings of the previous brake and drive systems.

6.1 Cam Actuated Brake System

Figure 6:
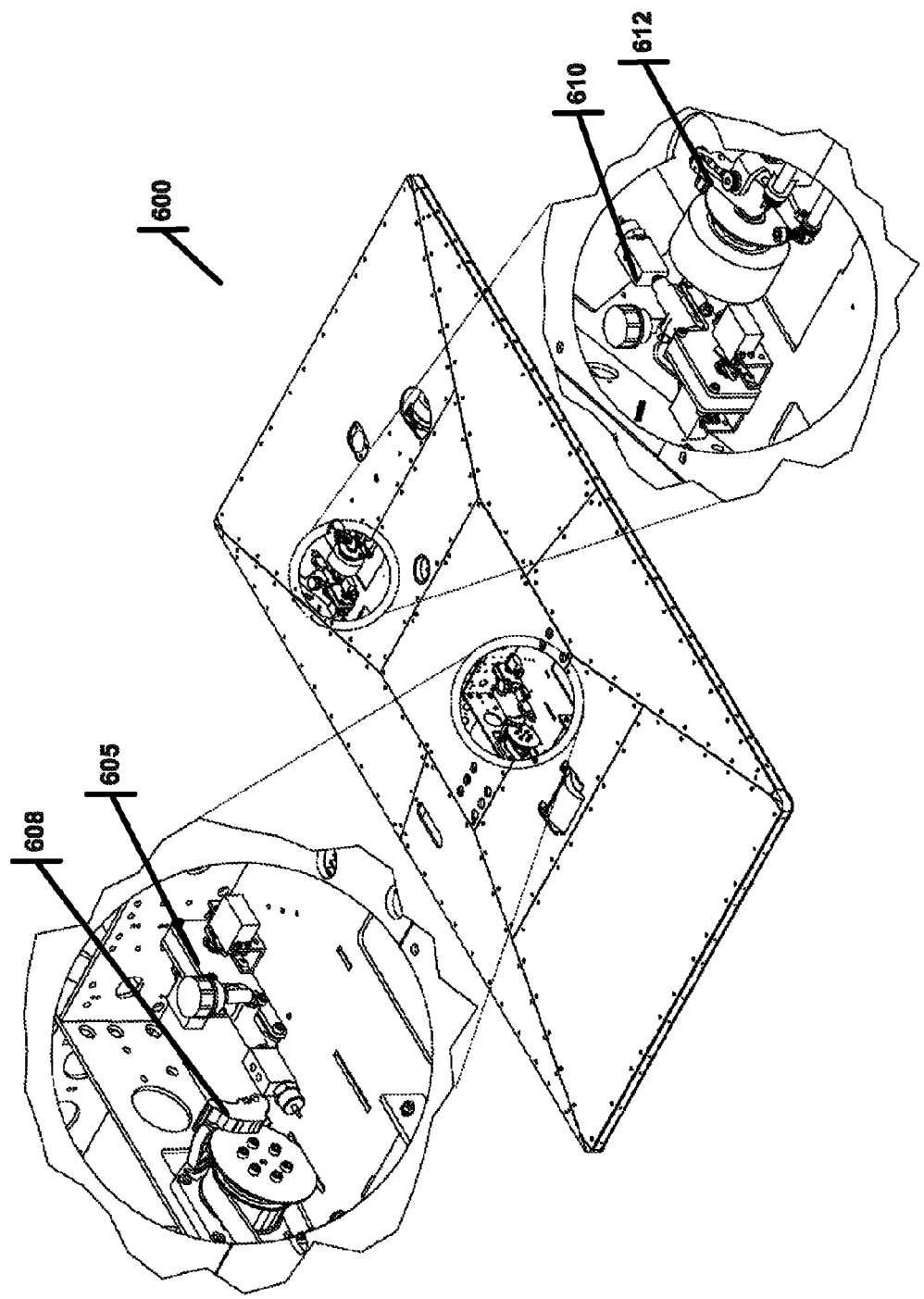
FIG. 6 is an isometric view of a dynamic motion element with a novel master cylinder using a cam.
Figure 7:
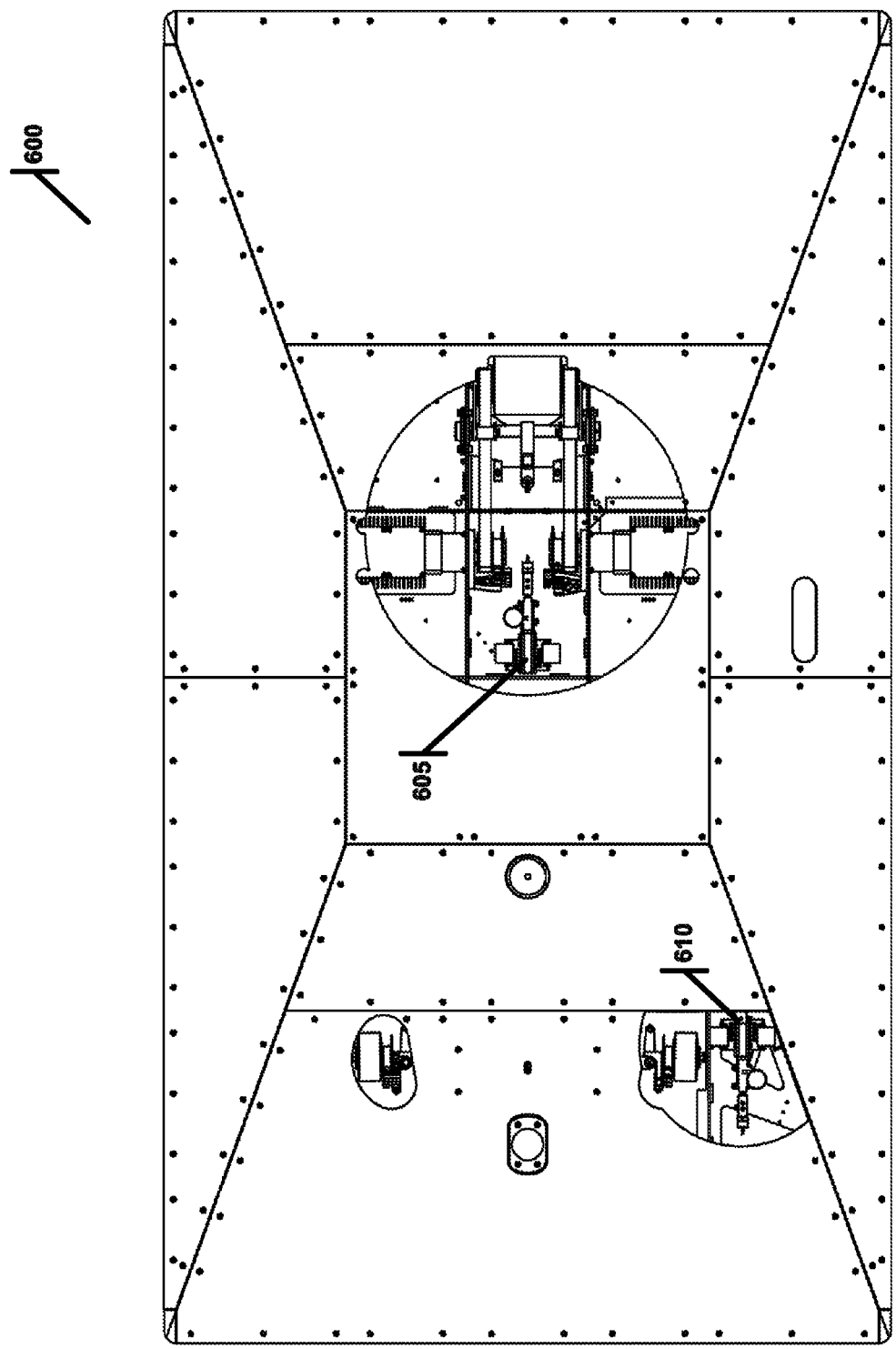
FIG. 7 is a top view of the dynamic motion element with a novel master cylinder using a cam shown in FIG. 6.

FIGS. 6 and 7 illustrate a DME 600 with certain sections cut out showing the location of the braking system. Assembly 605 is the cam actuated hydraulic master cylinder for the rear wheels of the DME. The rear wheel brake assembly 608 is located on the axle from the electric motor. Assembly 610 is the cam actuated hydraulic master cylinder for the front wheels of the DME. The front brake assembly 612 is on the wheel axle. Both the front and rear wheel brake assemblies 608 and 612 are disc brakes.

Figure 8:
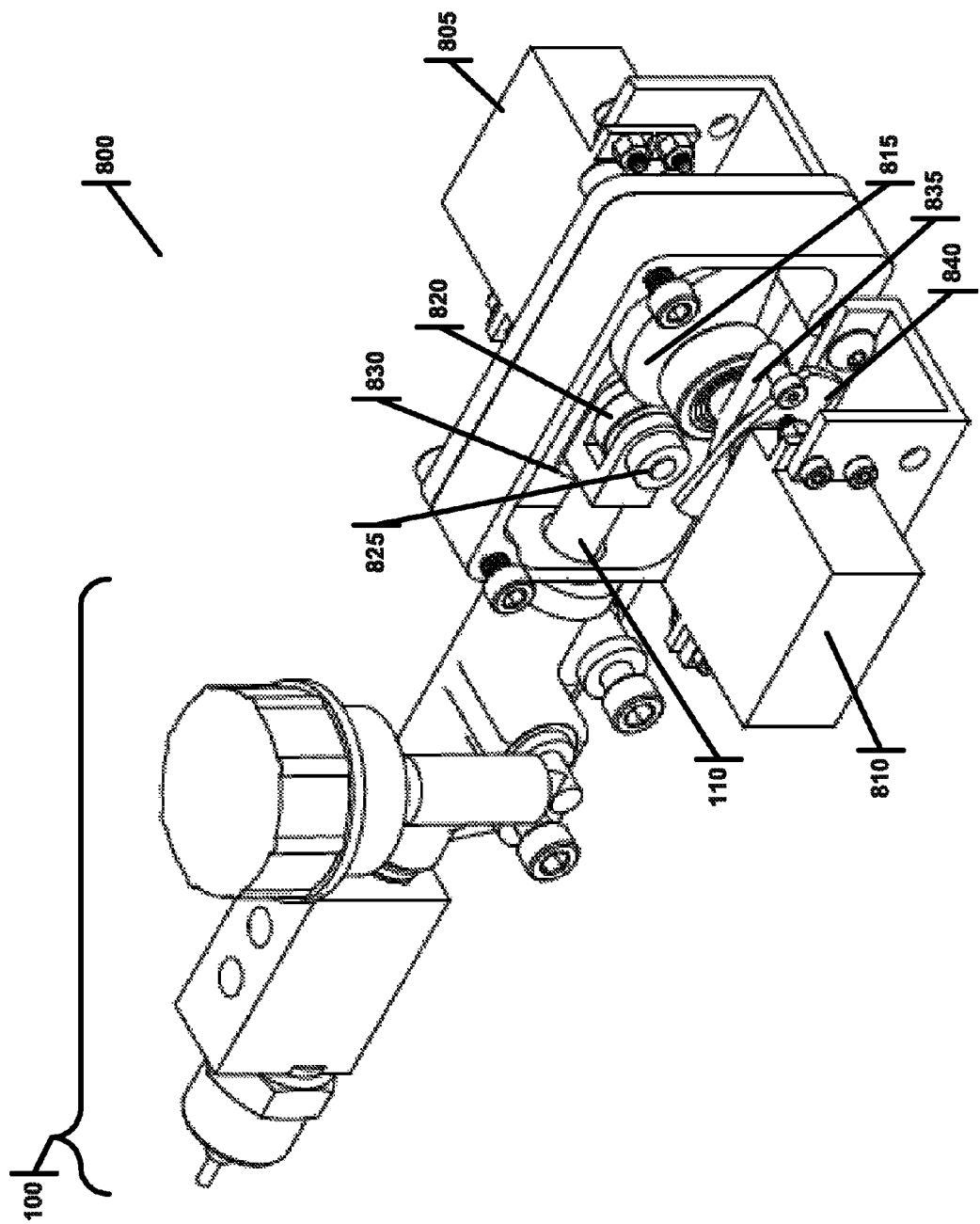
FIG. 8 is an isometric view of a novel master cylinder actuated by a cam.

Turning now to FIG. 8, a cam actuated braking system 800 is disclosed. The system 800 includes a hydraulic master cylinder 100 that includes a piston push rod 110. Servo motors 805 and 810 are connected to a servo arm 840 (there may be a corresponding servo arm connected to servo 805, not shown). The servo arm 840 contacts the cam roller arm 835 when it is rotated, with the cam roller arm 835 connected to the cam 815. Given this construction, when the servo 810 is actuated, it turns the servo arm 840, which then contacts and turns the cam roller arm 635, thereby rotating the cam 815. Connected to the piston push rod 110 is a rolling cam follower 820, that contacts and rolls against the cam 815, as the cam 815 rotates. Upon rotation of the cam 815, therefore, the piston push rod 110 is pushed into the master cylinder 100, thus causing the hydraulic brake fluid to be pushed under pressure to the DME brake system.

To optimize performance, the rolling cam follower 620 should be maintained in the same rotation plane as that of the cam 815. The cam rolling follower 820 may also have an alignment roller 825 that travels within an alignment roller slot 830. Shown in FIG. 8 are actually two alignment rollers with two alignment slots. Because a cover of the system 800 has been removed to show the inner workings, the second alignment slot which would be in that cover is not shown. The cam roller follower is not necessary to the operation of the system, or it might actually comprise a complete sphere within a housing—similar to a roll-on deodorant stick.

Because such a structure can rotate in any direction, it would not need the alignment roller 825 and slot 830.

Although not shown in FIG. 8, servo 805 also has a servo arm and cam roller arm, as described with reference to servo 810 above. The reason for the two servos is safety. If only a single servo controlled the system and that servo were to fail, then the braking of the DME would be compromised. Using two servos 805 and 810 adds redundancy such that if one fails the other can still apply the brakes. As an added safety feature, the servos may not be directly linked to the cam 815. In other words, one servo can rotate the cam without, in the process, rotating the other servo. This is important because if a servo siezes, and both servos where in a fixed linkage with each other, then the non-siezed servo might not have sufficient power to rotate the cam 815 and the siezed servo. To address this, the servos 805 and 810 may actuate the cam 815 without a corresponding rotation of the other servo. This may be accomplished by the servo arm 840 and the cam roller arm 835. It is the cam roller arm 835 that is in direct fixed linkage with the cam 815. So if, for example servo 810 becomes siezed then servo arm 840 would not rotate, but it is apparent that the cam roller arm 835 could still rotate thereby allowing the other servo 805 to actuate the brake system. Also, as illustrated, it is the cam roller arm 835 that has the projection with a roller that contacts the servo arm 840. The projection may be on either the servo arm 840 or the cam roller arm 835, and does not necessarily need rollers.

The cam actuated brake system need not implement two servos, it can have a single servo although there might be safety concerns should that servo fail. The servo may also be directly linked to the cam 815, thus the servo arm 840 and the cam roller arm 835 may be omitted.

Figure 9:
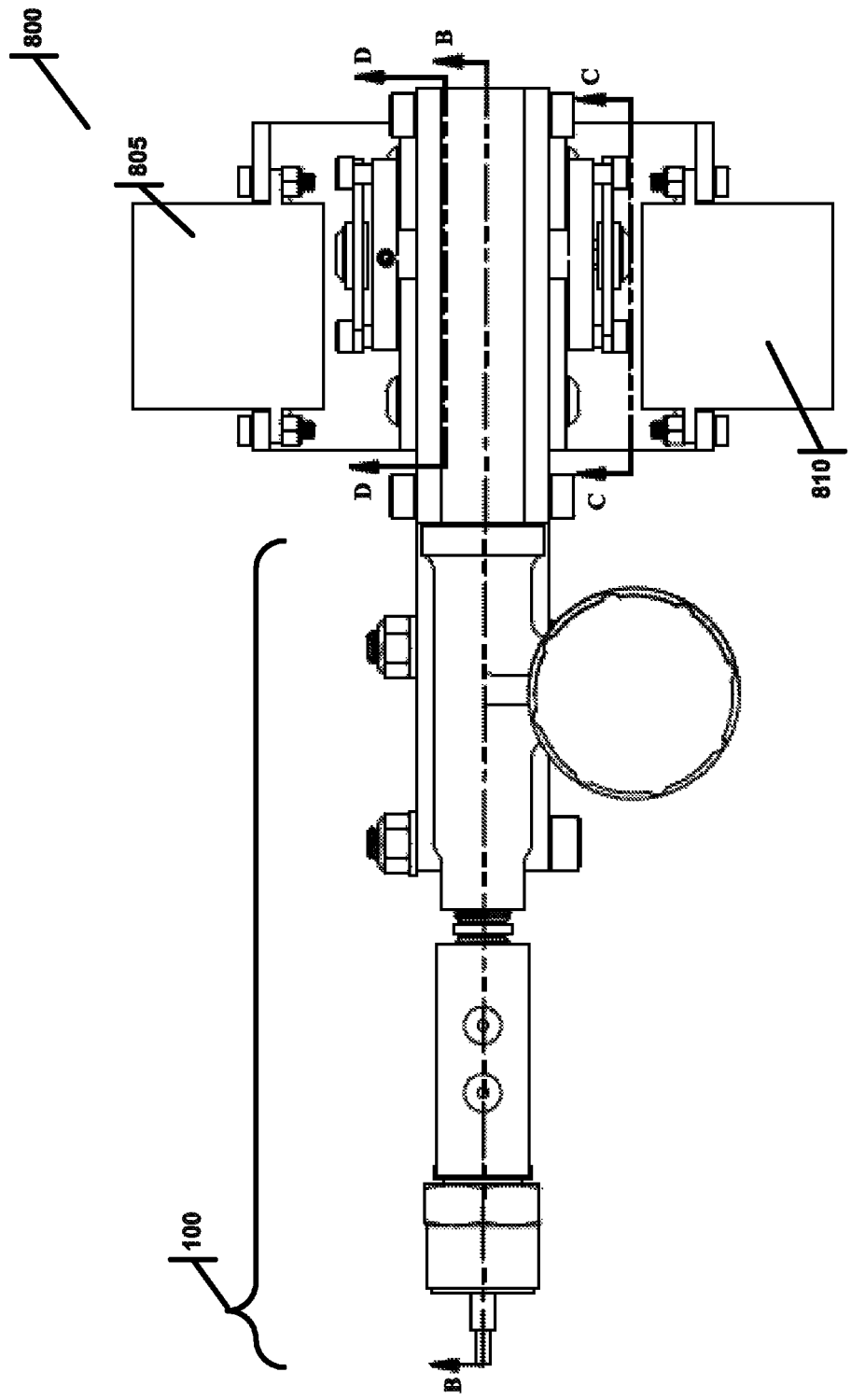
FIG. 9 is a top view of the novel master cylinder actuated by a cam shown in FIG. 8.

FIG. 9 illustrates a top view of the cam actuated braking system 800 with a master cylinder 100 and two servos 805 and 810. There are three cross sectional lines shown B-B, C-C and D-D. Each of those cross sectional views will be described with reference to FIGS. 10A, 10B and 10C, respectively. FIG. 10A (the cross-sectional view along line B-B of FIG. 9) shows the operation of the cam 815. As the cam 815 is rotated by the servos in the direction of arrow 850, the cam roller follower 820 rolls along the surface of the cam 815, causing the cam roller follower 820 and the piston push rod 110 to move in the direction of arrow 855. That movement causes the pressurized distribution of hydraulic brake fluid to the DME brake system.

FIG. 10B (the cross-sectional view along line C-C of FIG. 9) illustrates the safety feature of the servo arm 840 and cam roller arm 835. As can be seen the cam roller arm 835 is free to rotate in the direction of arrow 850 without obstruction from the servo arm 840. Thus the opposite servo can rotate the cam 815 without obstruction.

FIG. 10C (the cross-sectional view along line D-D of FIG. 9) illustrates the alignment feature of the alignment roller 825 and the alignment roller slot 830. As the cam 815 pushes on the cam roller follower (not shown), the alignment roller 825 travels within the alignment slot 830, preventing the cam roller follower from rotating out of the plane of the cam 815.

Figure 11:
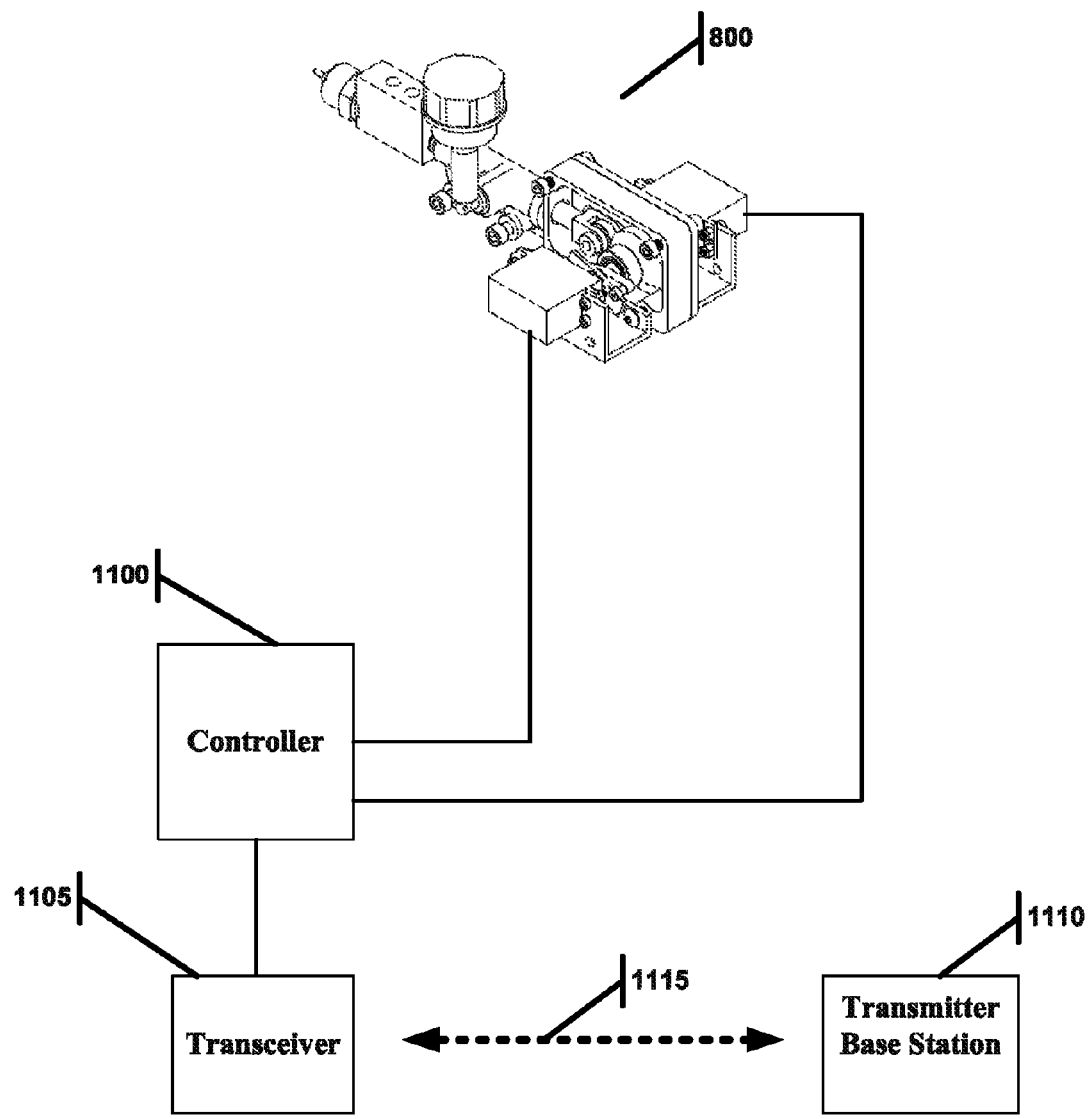
FIG. 11 illustrates the novel master cylinder actuated by a cam connected to a controller and receiver for wireless control.

Control of the servos may be accomplished by a brake signal issued by the controller 1100 shown in FIG. 11, for example when the system is pre-programmed and is autonomous. The servos can also brake under a wireless emergency brake signal from the base station 1110. The DME may have a transceiver 1105 to receiver wireless signals 1115 from the base station 1110, with those signals actuating the brake system. The controller 1110 may also be adapted to monitor the performance and operation of the servos, such that if it detects a servo failure it can send a signal to the other servo to actuate and also send a signal to the electric motors to stop producing power. The controller can also use the transceiver 1105 to send data 1115 to the base station 1110 reporting the performance of the brake system.

While the cam actuated braking system has been described in conjunction with a DME, it would be apparent that the system can be implemented in a variety of vehicles. The above described embodiments are not intended to limit the scope of the invention, which is defined by the claims that follow.

6.2 In Plane Tensioner Pulley Drive System

Figure 12:
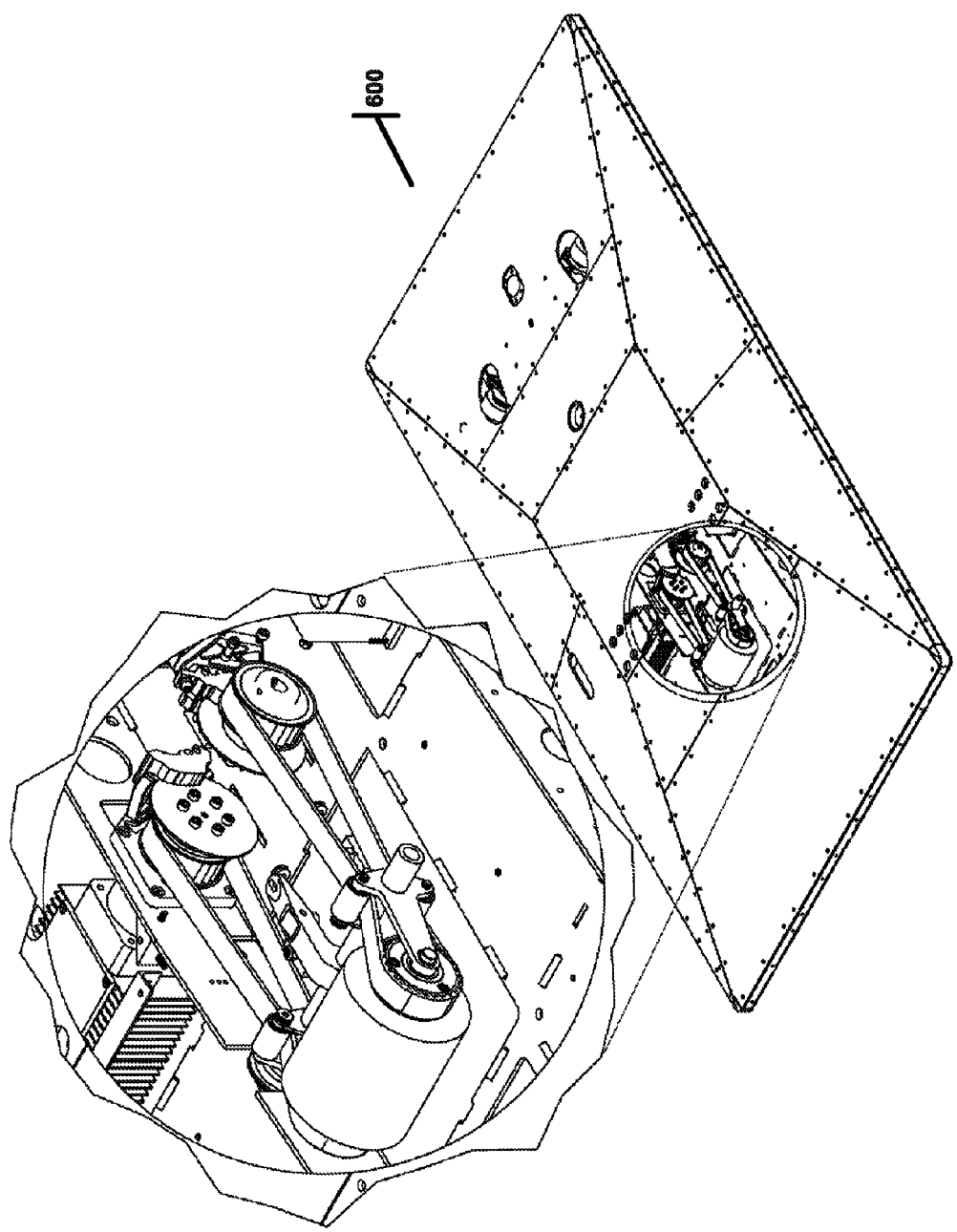
FIG. 12 is an isometric view of a dynamic motion element with a novel belt tensioner pulley system

FIG. 12 illustrates a DME 600 with a section cut out showing the location of the belt drive system. As shown here there are two belt drives, each of which is constructed as follows.

Figure 13:
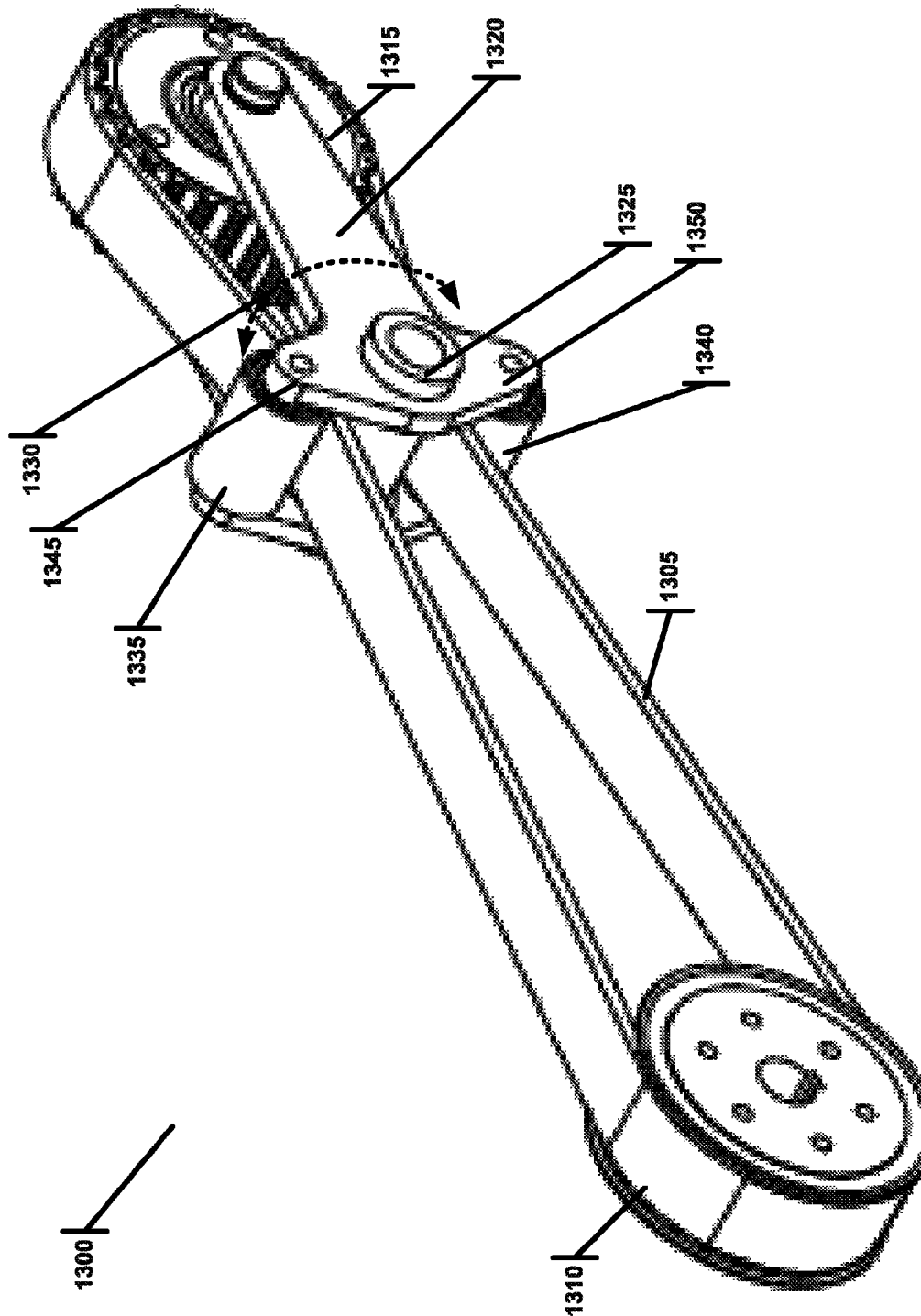
FIG. 13 is an isometric view of a novel belt tensioner pulley system.

FIG. 13 illustrates the in plane pulley belt drive system 1300. Belt 1305 transfers power from the drive pulley 1310 to the driven pulley 1315. The drive pulley 1310 may be connected to a motor. The system 1300 has an articulating arm 1320 that pivots about the pivot axis 1325 (shown by movement arrow 1330), and at the end of the arm is located the driven pulley 1315. This allows the driven pulley 1315 to also pivot about the pivot axis 1325. The articulating arm also has tensioner pulleys 1335 and 1340 connected to it, and those pulleys come into contact with the belt 1305. Because the pulleys 1335 and 1340 connected to the articulating arm 1320, they also can rotate about pivot axis 1325. Each of the tensioner pulleys has an axle 1345 and 1350, about which the tensioner pulley can spin.

Figures 14A, 14B:
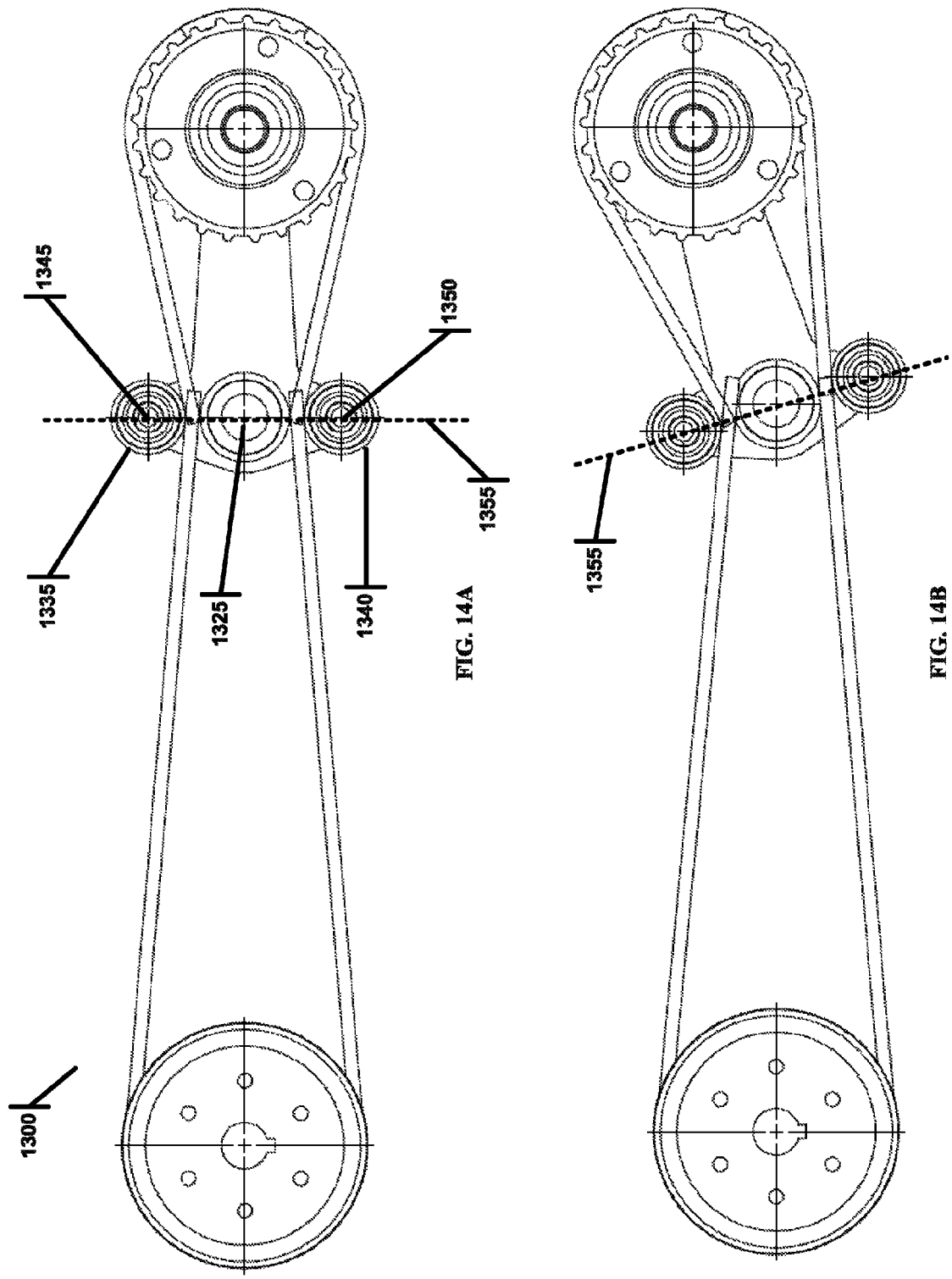
FIG. 14A is a side view of the belt tensioner pulley system of FIG. 13 in the neutral position.
FIG. 14B is a side view of the belt tensioner pulley system of FIG. 13 wherein one axle is in a non-neutral up position.

In a preferred embodiment the axles 1345 and 1350 of the tensioner pulleys 1335 and 1340 may be located in a generally straight line with the pivot axis 1325, as shown by dashed line 1355 in FIG. 14A. Also, the distance of the axles 1345 and 1350 may be equidistant from the pivot axis 1325. This positioning of the tensioner pulleys 1335 and 1340, helps to maintain a near constant needed belt length. Further, since the system is symmetrical, the belt tension is maintained for both forward and reverse operation.

Figure 15:
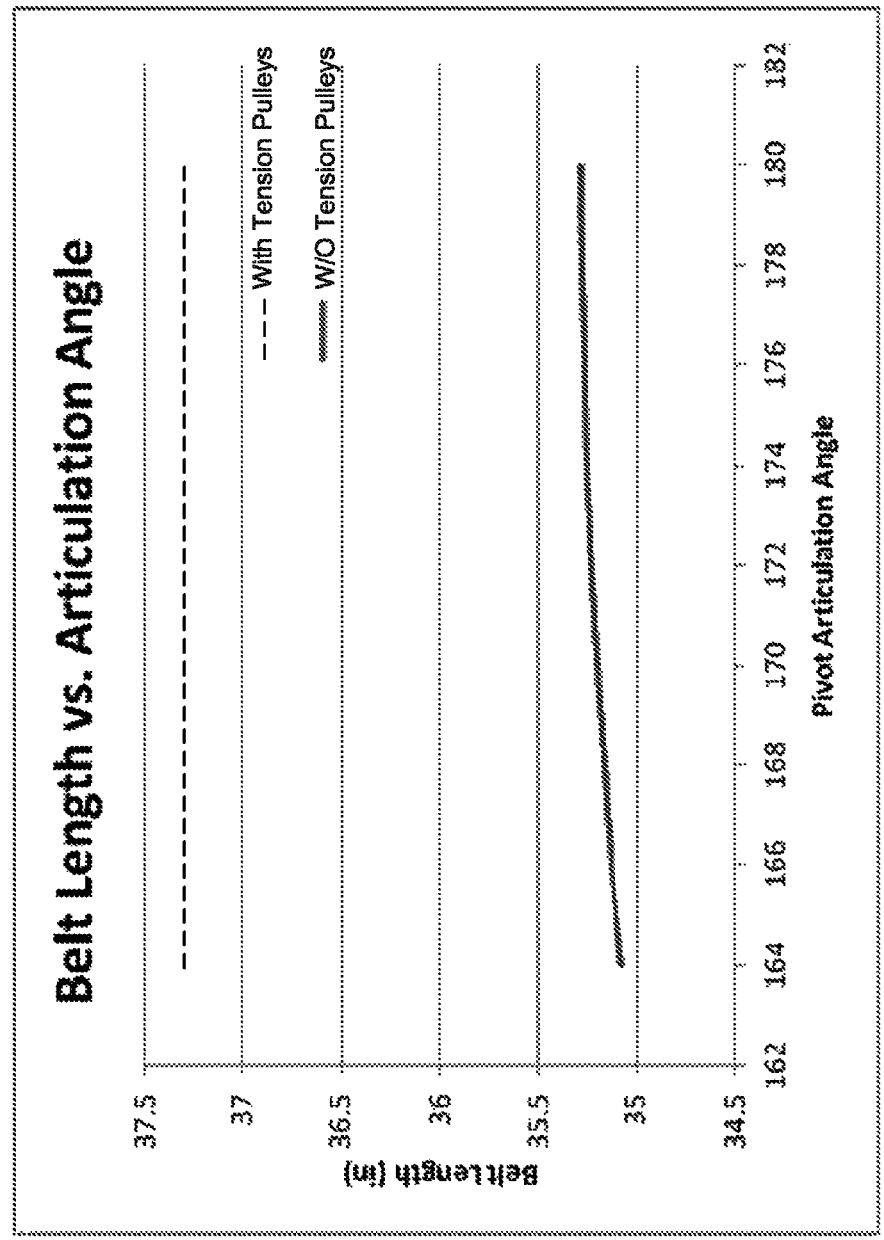
FIG. 15 is a graph showing the difference in belt length for a belt drive with the tensioner pulley system of FIG. 13 compared to a belt drive without such a system.

For an example embodiment, as shown below, the required belt length changes only by 0.008 inches throughout the allowable articulation stroke of the pivot axis, while a similar design without tensioner pulleys would change the required belt length by 0.210 inches for the same articulation angle (i.e., 26 times the change in belt length). The results are provided below in Table 2, and shown graphically in FIG. 15.

TABLE 1

| Parameter | Value (in) |
| --- | --- |
| Drive Pulley Diameter | 3.1 |
| Driven Pulley Diameter | 3.1 |
| Drive Pulley to Pivot Axis Length | 8.9 |
| Tensioner Pulley Diameter | 1 |
| Tensioner Pulley Separation | 2.6 |
| Pivot Axis to Driven Pulley Length | 3.875 |

TABLE 2

| Articulation Angle (deg) | Belt Length With Tensioner Pulleys (in) | Belt Length Without Tensioner Pulleys (in) |
| --- | --- | --- |
| 180 | 37.296 | 35.289 |
| 179 | 37.296 | 35.288 |
| 174 | 37.297 | 35.259 |
| 172 | 37.298 | 35.236 |
| 170 | 37.299 | 35.207 |
| 168 | 37.3 | 35.171 |

TABLE 2-continued

| Articulation Angle (deg) | Belt Length With Tensioner Pulleys (in) | Belt Length Without Tensioner Pulleys (in) |
| --- | --- | --- |
| 167 | 37.301 | 35.150 |
| 166 | 37.302 | 35.128 |
| 165 | 37.303 | 35.104 |
| 164 | 37.304 | 35.079 |
| Maximum Difference | 0.008 | 0.210 |

By maintaining a near constant belt length throughout the allowable articulation stroke of the pivot axis, the belt does not suffer slippage. Less slippage allows for better belt control in both forward and reverse operation. And because the DME 600 illustrated in FIG. 12 applies the brake to the drive pulley, reducing the belt slippage increases the braking performance and safety of the DME 600.

As will be apparent to persons skilled in the art, modifications and adaptations to the above-described example embodiments of the invention can be made without departing from the spirit and scope of the invention, which is defined only by the following claims.

The invention claimed is:

1. A Dynamic Motion Element for use in testing crash avoidance technologies in a subject vehicle, the Dynamic Motion Element comprising:
a body comprising an upper surface wherein the upper surface is adapted to support a soft-body having the size and shape of a vehicle or portion of a vehicle, the body having at least one tapered side so as to allow the subject vehicle to drive up to and on the upper surface with minimal to no damage to the subject vehicle or the Dynamic Motion Element, the body supported by a plurality of wheels, including at least one driven wheel rotationally coupled with an electronically-controlled power source, and at least one steerable wheel coupled with an electronically-controlled steering system; and
an electronically-controlled braking system attached with and capable of applying braking force to one or more of the plurality of wheels.

2. The Dynamic Motion Element of claim 1, wherein the electronically-controlled braking system is capable of applying braking force to each of the plurality of wheels independently.

3. The Dynamic Motion Element of claim 1, wherein the plurality of wheels include at least one front wheel and at least one rear wheel, and wherein the electronically-controlled braking system is capable of applying braking force to the at least one front wheel independently from the at least one rear wheel.

4. The Dynamic Motion Element of claim 1, wherein the electronically-controlled braking system further comprises: a plurality of electronically-controlled servos each mechanically coupled to separate master cylinders that are each hydraulically coupled to at least one braking mechanism, each braking mechanism mechanically coupled to one or more of the wheels.

5. The Dynamic Motion Element of claim 1, wherein the electronically-controlled braking system further comprises: a first electronically-controlled servo mechanically coupled to a first master cylinder that is hydraulically coupled to at least one braking mechanism, a second electronically-controlled servo mechanically coupled to a second master cylinder that is hydraulically coupled to at least one braking mechanism, wherein each braking mechanism is mechanically coupled to one or more of the wheels.

6. The Dynamic Motion Element of claim 1, wherein the electronically-controlled braking system further comprises: a first electronically-controlled servo mechanically coupled to a first master cylinder that is hydraulically coupled to at least one braking mechanism, a second electronically-controlled servo mechanically coupled to a second master cylinder that is hydraulically coupled to at least one braking mechanism, a third electronically-controlled servo mechanically coupled to a third master cylinder that is hydraulically coupled to at least one braking mechanism, wherein each braking mechanism is mechanically coupled to one or more of the wheels.

7. The Dynamic Motion Element of claim 1, wherein the electronically-controlled braking system further comprises: a first electronically-controlled servo mechanically coupled to a first master cylinder that is hydraulically coupled to at least one braking mechanism, a second electronically-controlled servo mechanically coupled to a second master cylinder that is hydraulically coupled to at least one braking mechanism, a third electronically-controlled servo mechanically coupled to a third master cylinder that is hydraulically coupled to at least one braking mechanism, a fourth electronically-controlled servo mechanically coupled to a fourth master cylinder that is hydraulically coupled to at least one braking mechanism, wherein each braking mechanism is mechanically coupled to one or more of the wheels.

8. The Dynamic Motion Element of claim 1, comprising a plurality of electronically-controlled servos that are independently-controllable by a computer on-board the Dynamic Motion Element.

9. The Dynamic Motion Element of claim 8, wherein the plurality of electronically-controlled servos are independently-controllable by wireless signals.

10. The Dynamic Motion Element of claim 8, wherein the plurality of electronically-controlled servos are independently-controllable by a computer on-board the Dynamic Motion Element, and at least one of the electronically-controlled servos are also independently-controllable by wireless signals.

11. The Dynamic Motion Element of claim 1, wherein the braking system comprises anti-lock brakes.

12. The Dynamic Motion Element of claim 1, wherein the braking system comprises stability control.

13. The Dynamic Motion Element of claim 1, wherein the braking system comprises separate hydraulic fluid reservoirs for separate master cylinders.

14. The Dynamic Motion Element of claim 1, wherein the Dynamic Motion Element is adapted to receive wireless communication signals from a remote communication source, the electronically-controlled braking system adapted to apply braking force to at least one of the wheels when wireless communication signals are not received from the remote communication source.

15. The Dynamic Motion Element of claim 1, wherein the electronically-controlled braking system further comprises: at least one wheel being mechanically coupled to a plurality of separately-actuated braking mechanisms.

16. The Dynamic Motion Element of claim 15, wherein the separately-actuated braking mechanisms are each actuated hydraulically by separate master cylinders.

17. The Dynamic Motion Element of claim 1, wherein the electronically-controlled braking system comprises a caliper connected to one or more of the plurality of wheels.

18. The Dynamic Motion Element of claim 1, wherein the electronically-controlled braking system applies the braking force in a pre-programmed manner.

19. The Dynamic Motion Element of claim 1, wherein the electronically-controlled braking system comprises a computer program, the program comprising instructions to apply the braking force.

20. The Dynamic Motion Element of claim 1, wherein the electronically-controlled braking system applies the braking force according to a wireless signal from a remote communication source.

21. A method of electronically changing the braking bias among the wheels of a Dynamic Motion Element for use in testing crash avoidance technologies in a subject vehicle, comprising the steps of:

providing a Dynamic Motion Element comprising:

a body comprising an upper surface wherein the upper surface is adapted to support a soft-body having the size and shape of a vehicle or portion of a vehicle, the body having at least one tapered side so as to allow the subject vehicle to drive up to and on the upper surface with minimal to no damage to the subject vehicle or the Dynamic Motion Element, the body supported by a plurality of wheels, including at least one driven wheel rotationally coupled with an electronically-controlled power source, and at least one steerable wheel coupled with an electronically-controlled steering system; and an electronically-controlled braking system attached with and capable of applying braking force to a plurality of the wheels independently; and electronically controlling the braking system to change the amount of braking force applied to one or more of the wheels relative to the amount of braking force applied to one or more of the other wheels.

22. The method of claim 21, wherein the step of electronically controlling the braking system to change the relative amounts of braking force among the wheels is accomplished by wireless communication with the Dynamic Motion Element.

23. The method of claim 21, wherein the step of electronically controlling the braking system to change the relative amounts of braking force among the wheels is accomplished according to a computer program.

24. The method of claim 21, wherein the step of electronically controlling the braking system to change the relative amounts of braking force among the wheels is accomplished automatically by a computer based on feedback from one or more sensors on the Dynamic Motion Element.

25. The method of claim 24, wherein the one or more sensors include any of: sensors that output signals corresponding to the rotational speed of one or more of the wheels; and sensors that output signals corresponding to forces on one or more of the wheels.

* * * * *